United States Patent
Snyder et al.

(10) Patent No.: US 11,979,451 B2
(45) Date of Patent: May 7, 2024

(54) COMMUNICATION QUEUE

(71) Applicant: StarKix Inc., New York, NY (US)

(72) Inventors: Timothy Martin Snyder, New York, NY (US); Robyn Louise Kernaghan, New York, NY (US); Lee Raymond Kernaghan, New York, NY (US); Mark Winfield, New York, NY (US); Randall Ramusack, New York, NY (US)

(73) Assignee: StarKix Inc., New York, NY (US)

( * ) Notice: Subject to any disclaimer, the term of this patent is extended or adjusted under 35 U.S.C. 154(b) by 0 days.

(21) Appl. No.: 18/335,018

(22) Filed: Jun. 14, 2023

(65) Prior Publication Data
US 2023/0412666 A1    Dec. 21, 2023

Related U.S. Application Data

(60) Provisional application No. 63/352,632, filed on Jun. 15, 2022.

(51) Int. Cl.
| | |
|---|---|
| *H04L 65/80* | (2022.01) |
| *G06Q 20/40* | (2012.01) |
| *H04L 12/14* | (2006.01) |
| *H04L 65/1069* | (2022.01) |

(52) U.S. Cl.
CPC .............. *H04L 65/80* (2013.01); *G06Q 20/40* (2013.01); *H04L 12/1457* (2013.01); *H04L 65/1069* (2013.01)

(58) Field of Classification Search
CPC . H04L 65/80; H04L 12/1457; H04L 65/1069; G06Q 20/40
See application file for complete search history.

(56) References Cited

U.S. PATENT DOCUMENTS

| | | | |
|---|---|---|---|
| 9,531,822 B1 * | 12/2016 | Lintz | ...................... H04L 67/535 |
| 10,409,825 B1 | 9/2019 | Gau et al. | |
| 10,694,028 B2 * | 6/2020 | Zhuk | ....................... H04M 3/36 |

(Continued)

OTHER PUBLICATIONS

International Search Report and Written Opinion received for PCT Patent Application No. PCT/US23/068508, dated Oct. 4, 2023, 13 pages.

*Primary Examiner* — Oanh Duong
(74) *Attorney, Agent, or Firm* — WORKMAN NYDEGGER

(57) ABSTRACT

A data communication queuing method includes receiving a communication start notification from a first computing device associated with a first user account, accessing a list of a plurality of other user accounts linked to the first user account, sending a communication availability notification to at least a portion of other user accounts, operating a digital communication queue, enabling a live digital communication between the first user account and the at least one user account for a predetermined period, and ending the live digital communication between the first user account and the at least one user account of the multiple other user accounts after the predetermined period. The digital communication queue is operated by receiving a queue-join request from multiple other user accounts, enqueuing the multiple other user accounts in a determined order, and dequeuing at least one user account of the multiple other user accounts.

24 Claims, 7 Drawing Sheets

(56) References Cited

U.S. PATENT DOCUMENTS

| | | |
|---|---|---|
| 11,013,481 B2 | 5/2021 | Pfister |
| 11,310,538 B2 * | 4/2022 | Holmberg ........ H04N 21/43072 |
| 11,757,999 B1 * | 9/2023 | Skinner ................ H04L 67/141 |
| | | 709/227 |
| 2007/0218446 A1 * | 9/2007 | Smith ...................... G09B 5/00 |
| | | 434/350 |
| 2015/0188928 A1 | 7/2015 | Shapiro |
| 2016/0099892 A1 * | 4/2016 | Palakovich ............. H04L 51/04 |
| | | 709/206 |
| 2016/0182721 A1 * | 6/2016 | Khalatian ........... H04L 41/5064 |
| | | 379/265.09 |
| 2019/0020694 A1 | 1/2019 | Winawer et al. |
| 2020/0074519 A1 * | 3/2020 | Devageorge ............ H04W 4/21 |
| 2020/0244711 A1 * | 7/2020 | Engel ...................... H04L 65/60 |
| 2021/0160584 A1 * | 5/2021 | April ................ H04N 21/2343 |
| 2021/0168462 A1 * | 6/2021 | April ..................... H04L 65/752 |
| 2021/0258650 A1 * | 8/2021 | Wagner .................. G06Q 10/10 |
| 2022/0174154 A1 | 6/2022 | Bohannon et al. |
| 2023/0132714 A1 * | 5/2023 | Bohannon .............. H04L 65/612 |
| | | 709/224 |

* cited by examiner

COMMUNICATION QUEUE

CROSS-REFERENCE TO RELATED APPLICATIONS

This application claims the benefit of and priority to U.S. Provisional Patent Application Ser. No. 63/352,632 filed on Jun. 15, 2022, and entitled "An automated service to connect celebrities and fans for one-one live experiences on demand," which is expressly incorporated herein by reference in its entirety.

FIELD

The present disclosure relates generally to systems, methods, and computer-readable media for a communication queue, and particularly for connecting users and followers for one-on-one live digital communication via a digital communication queue.

BACKGROUND

There is a multi-billion-dollar market built around fan engagement today that includes online and in person opportunities for fans to engage and better get to know their favorite celebrities. Many different groups and organizations have created opportunities for fans to engage with celebrities. Generally, there have been live in-person events, virtual live streaming events, live virtual chats, and through individualized messages. Due to a large number of fans of celebrities, it has been rare for fans to find opportunities to meet celebrities one-on-one basis.

One-on-one virtual events that have existed require fans to make advanced purchases and require celebrities to schedule the live experiences in advance. Other live experiences where the celebrity is "live now" do not actively pull participants into a systematic queue for the celebrity.

If celebrities are required to pre-schedule their one-on-one live virtual experiences, they lose the spontaneous opportunity to engage with fans when they have free time and interest but have not pre-scheduled their virtual live events. Conversely, if they "go live", but do not have a ready list of fans to notify, they might find themselves waiting without a well-managed stream of fans to engage with.

The subject matter claimed herein is not limited to aspects that solve any disadvantages or that operate only in environments such as those described above. Rather, this background is only provided to illustrate one exemplary technology area where some aspects described herein may be practiced.

BRIEF SUMMARY

The present disclosure is related to systems, methods, and computer readable media for connecting celebrities and followers for one-on-one live digital communications via a digital communication queue. These systems, methods, and computer readable media provide curating potential fans on behalf of celebrities, instantly notifying the potential fans when the celebrity is ready to engage in one-on-one live digital communications, and organize and build a digital communications queue of fans that systematically enter the live digital communication. Further, these systems may enable fans to ping celebrities so that celebrities may be able to determine the best time for a live digital communication. Furthermore, these systems provide a virtual selfie to a fan after the live digital communication so that fans can memorialize the moment of the live digital communication.

One aspect illustrated herein includes a data communication queuing method for connecting users and followers for one-on-one live digital communication via a digital communication queue. The data communication queuing method includes receiving a communication start notification from a first computing device associated with a first user account, accessing a list of a plurality of other user accounts that are linked to the first user account, sending a communication availability notification to at least a portion of the plurality of other user accounts, operating a digital communication queue, enabling a live digital communication between the first user account and the at least one user account of the multiple other user accounts for a predetermined period, and ending the live digital communication between the first user account and the at least one user account of the multiple other user accounts after the predetermined period. The digital communication queue is operated by receiving a queue-join request from multiple other user accounts selected from the plurality of other user accounts, in response to the queue-join request, enqueuing the multiple other user accounts in a determined order, and dequeuing at least one user account of the multiple other user accounts in the determined order.

Another aspect illustrated herein includes a data communication queuing system for connecting users and followers for one-on-one live digital communication via a digital communication queue. The data communication queuing system includes one or more processors and one or more storage media including instructions stored thereon. The instructions, when executed by the one or more processors, cause the data communication queuing system to receive a communication start notification from a first computing device associated with a first user account, access a list of a plurality of other user accounts that are linked to the first user account, send a communication availability notification to at least a portion of the plurality of other user accounts, operate a digital communication queue, enable a live digital communication between the first user account and the at least one user account of the multiple other user accounts for a predetermined period, and end the live digital communication between the first user account and the at least one user account of the multiple other user accounts after the predetermined period. The digital communication queue is operated by receiving a queue-join request from multiple other user accounts selected from the plurality of other user accounts, In response to the queue-join request, enqueuing the multiple other user accounts in a determined order and dequeuing at least one user account of the multiple other user accounts in the determined order.

Still another aspect illustrated herein includes a non-transitory computer-readable medium including instructions stored thereon that, when executed by a computer, cause the computer to perform a method for connecting users and followers for one-on-one live digital communication via a digital communication queue. The method includes receiving a communication start notification from a first computing device associated with a first user account, accessing a list of a plurality of other user accounts that are linked to the first user account, sending a communication availability notification to at least a portion of the plurality of other user accounts, operating a digital communication queue, enabling a live digital communication between the first user account and the at least one user account of the multiple other user accounts for a predetermined period, and ending the live digital communication between the first user account and the at least one user account of the multiple other user accounts after the predetermined period. The digital communication queue is operated by receiving a queue-join request from multiple other user accounts selected from the plurality of other user accounts, in response to the queue-join request, enqueuing the multiple other user accounts in a determined order, and dequeuing at least one user account of the multiple other user accounts in the determined order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific aspects which are illustrated in the appended drawings. Understanding that these drawings depict only typical aspects and are not therefore to be considered to be limiting in scope, aspects will be described and explained with additional specificity and detail through the use of the accompanying drawings in which.

DETAILED DESCRIPTION

Figure 1:
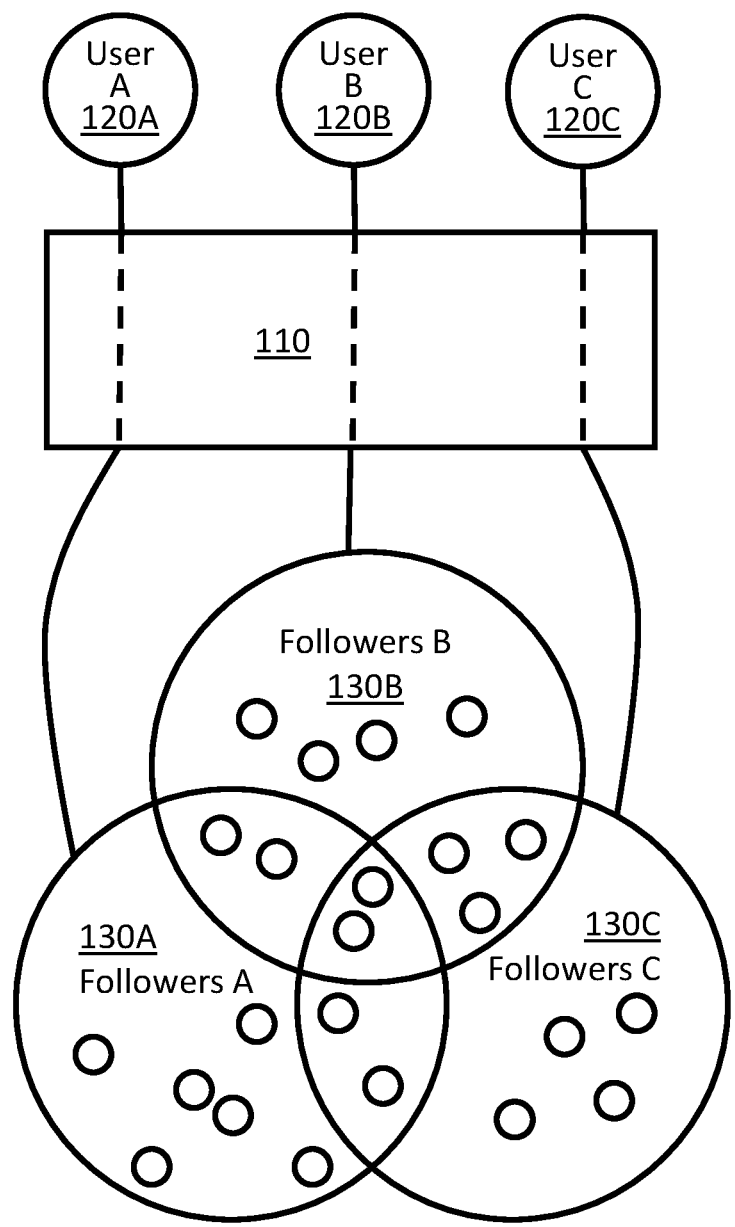
FIG. 1 illustrates a data communication queuing system between users and followers in accordance with aspects of the present disclosure.

The present disclosure is related to systems, methods, and computer readable media for connecting celebrities and fans for one-on-one live experiences via a communication queue. Celebrities or users are not required to schedule their live events in advance and fans or followers only need to meet predetermined requirements to have a live experience with users when they reach the top of the digital communication queue.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer-readable media such as computer memory. In particular, the computer memory may store computer-executable instructions that, when executed by the one or more processors, cause various functions to be performed, such as the acts recited in the aspects.

When a reference numeral refers to a group, the same reference number may also be used to refer to a single item or an individual of the group in this disclosure. Articles "a" and "an" may mean one or more in this disclosure. "A or B" may mean "A," "B," or "A and B" in this disclosure.

Referring now to FIG. 1, illustrated is a data communication queuing system 110 with users 120 (e.g., celebrities) and followers 130 (e.g., fans) according to aspects of the present disclosure. The data communication queuing system 110 may connect the users 120 and the followers 130 to have live digital communications so that the followers 130 may have a one-on-one live digital communication with a user 120. The live digital communication may be performed between digital devices, such as computers, laptops, tablets, smartphones, any other mobile computing devices, or terminals connected thereto. In this regard, for conciseness and simplicity purposes, the users 120, the followers 130, and their accounts at the data communication queuing system 110 may refer to their digital devices without confusion in this disclosure.

The data communication queuing system 110 may connect a user A 120A with a group A of followers 130A, a user B 120B with a group B of followers 130B, and a user C 120C with a group C of followers 130C. The number of users 120 managed by the data communication queuing system 110 is not limited to three but may be larger than three. Likewise, the number of followers 130 in each group managed by the data communication queuing system 110 may not be limited to a certain number of people so that any number of followers can follow the users 120, or may be limited to a certain number (e.g., one hundred, five hundred, one thousand, ten thousand, one hundred thousand, or any other manageable number.)

When a follower 130 wants to follow a user 120 and to have a live digital communication with the user 120, the follower 130 has to register for the user 120 at the data communication queuing system 110 so that the follower 130 can be saved in a corresponding list of the user 120. When a live digital communication is initiated by the user 120, the data communication queuing system may send a notification to all in the corresponding list of followers 130 and utilize a digital communication queue so that first coming followers 130 may be able to join live digital communications with the user 120.

In aspects, one follower 130 may be able to follow one or more users 120. For example, followers 130 who are members in the group A 120A and the group B 120B can follow both users A and B; followers 130 who are members in the groups A, B, and C can follow all three users A, B, and C. In this regard, the data communication queuing system 110 may store a list of followers 130 for each user 120 while permitting followers 130 to choose multiple users 120. On the other hand, a follower 130 who is only in group A 130A may not be able to follow the users B and C. When requested by a user 120, the data communication queuing system 110 may send a live digital communication notification to the corresponding list of followers 130 so that available followers 130 in the corresponding list may join the live digital communication with the user 120.

Figure 2:
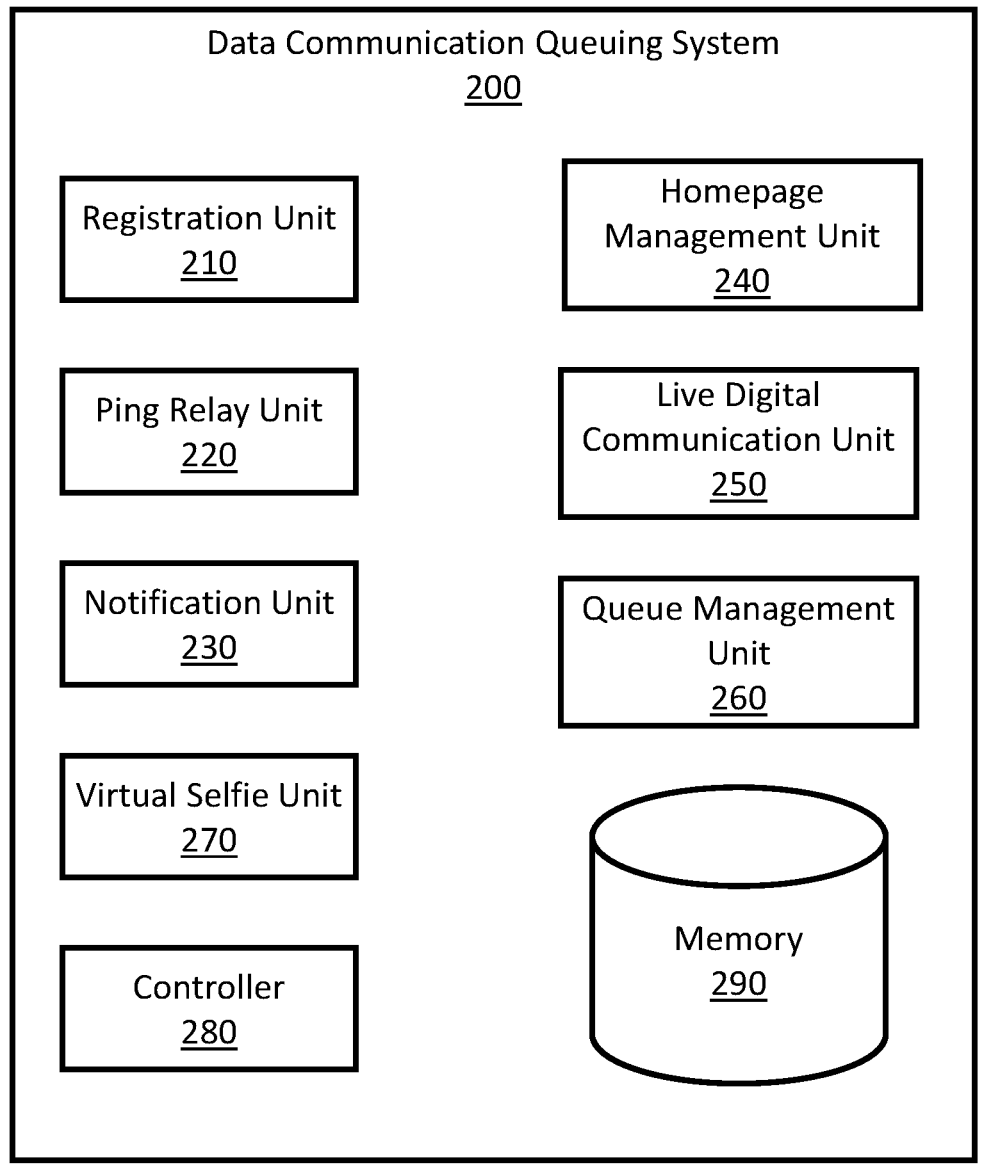
FIG. 2 illustrates a functional block diagram of a data communication queuing system in accordance with aspects of the present disclosure.

Referring now to FIG. 2, illustrated is a functional block diagram of a data communication queuing system 200, which may be the data communication queuing system 110 of FIG. 1 according to aspects of the present disclosure. The data communication queuing system 200 may include a registration unit 210, a ping relay unit 220, a notification unit 230, a homepage management unit 240, a live digital communication unit 250, a queue management unit 260, a virtual selfie unit 270, a controller 280, and a memory 290 storing databases. The registration unit 210 may provide a registration process for celebrities or users (such as users 120 of FIG. 1) and a separate registration process for fans or followers (e.g., follower 130 of FIG. 1).

The registration process for users may initiate the homepage management unit 240 to build a homepage for the user. The homepage page may provide introductory information or virtual entertainments of the user for followers or a live digital communication status. Further, the homepage may provide the followers profile of and virtual experiences about the user. Users may be able to adjust, revise, update the profile according to their tastes. Further, users may be able to upload pictures, audio, news articles, stories, and videos to the homepage.

In aspects, the controller 280 may provide a mode changing option to the users so that the users may change their mode from a user mode to a follower mode and vice versa. In other words, users can change to be followers so that they can select other users to follow. Based on this registration process, the registered users may be saved in a database in the memory 290.

The homepage management unit 240 may further build the main homepage, which displays users in the live digital communications, which lead followers to their users' homepages, so that they can be attracted to join the live digital communication. Further, through the user's homepage, followers may be able to send a short intro message to the user. The short messages may remain as sticky transparent notes on the user's home screen during the live digital communication, the user may be prompted with the relevant short messages to discuss with the followers.

The registration process for followers may allow followers to select one or more users to follow. Based on these registrations, the controller 280 may form a list of followers for each user. Since one follower may be able to select one or more users, the follower may be included in one or more lists for the users. The lists of followers may be saved in a database in the memory 290. The database may be a relational database.

The ping relay unit 220 may enable followers to ping users. Specifically, when a follower tries to ping a user, the ping relay unit 220 receives pings from followers and relays the pings to appropriate users. These pings may show when followers are available for a live digital communication and how many users are available at that time. Users may be notified upon reception of pings. Since many pings can cause disturbance, users may set silence notification for the pings and check the pings when available. The ping relay unit 220 may provide to users a daily, weekly, monthly trend of pings. Based on the trend, users may be able to find the best time window for live digital communications when the number of potential followers who can join the live digital communications is greater than a threshold value. Each user may have a corresponding threshold value. In other words, one threshold value of one user may be different from another threshold of another user.

Also based on the trend, a user may send a communication start notification to the data communication queuing system 200. Upon reception of the communication start notification, the notification unit 230 may access a list of followers who have registered for the user from the memory 290 and send a communication availability notification to the list of followers of the user. In aspects, the communication start notification may include a live digital communication start time, the predetermined period, a total period for live digital communications, and a price for each live digital communication. The live digital communication start time may be determined based on the trend and identify when the live digital communication starts. The predetermined period may be a period for each live digital communication. The total period for live digital communications is the total time of all live digital communications. The number of live digital communications may be determined by dividing the total period by the predetermined period. The price for each live digital communication is a price that a follower has to pay to join a live digital communication. The user may change the price based on the number of followers, the number of followers in the digital communication queue, or the number of followers in a virtual waiting room.

The user may set a direct donation to one or more charities from the proceed of the live digital communications. In this case, the total money donated to each charity may be updated in the user's homepage by the homepage management unit 240 so that positive influence of the user can be disseminated to the followers of the user via the user's homepage.

Now back to the live digital communication unit 250, a live digital communication may be initiated between a user and a follower. During the predetermined period, the user and the follower can have one-on-one live experience. To determine who is the next in line to join the next live digital communication, the queue management unit 260 may manage the digital communication queue. Inherent features of the digital communication queue is first-come-first-serve (FCFS) or first-in-first-out (FIFO). Thus, based on the temporal order when followers try to join the live digital communication, the queue management unit 260 enqueues the followers and dequeues the follower who has been enqueued first for the next live digital communication.

In an aspect, the queue management unit 260 may manage a priority queue, which has a higher priority than the digital communication queue. That means, followers in the priority queue may be dequeued before followers in the digital communication queue are dequeued. The queue management unit 260 may enqueue to the priority queue followers who have pinged the user within one or two hours before a live digital communication starts or follower who was in the previous digital communication queue but was not able to join a live digital communication.

In aspects, the queue management unit 260 may manage only one digital communication queue. To give a priority to followers who have pinged the user one or two hours before the live digital communication starts or who was in the previous digital communication queue but was not able to join the live digital communication over the other followers, the notification unit 230 may send the communication availability notification to them five, ten, or twenty minutes before sending it to other followers. In this way, the notification unit 230 may enable them to enter into the digital communication queue before others do the same.

Before a live digital communication is ended, the virtual selfie unit 270 may send a selfie notification to the user and the follower. The user and the follower may hold various poses for selfies. The virtual selfie unit 270 may provide various options for backgrounds. The user may be able to choose one background and one selfie, and the virtual selfie unit 270 may generate a virtual selfie by superimposing selfies over the chosen background. When satisfied, the user may select one virtual selfie, and the virtual selfie unit 270 may send the virtual selfie to the follower.

The controller 280 may control interaction among the units 210-270 and the memory 290 and control interactions between users and followers. For example, when a follower authorizes a payment to join a live digital communication, the controller 280 may process the payment or contact a third party to process the payment.

Figure 3:
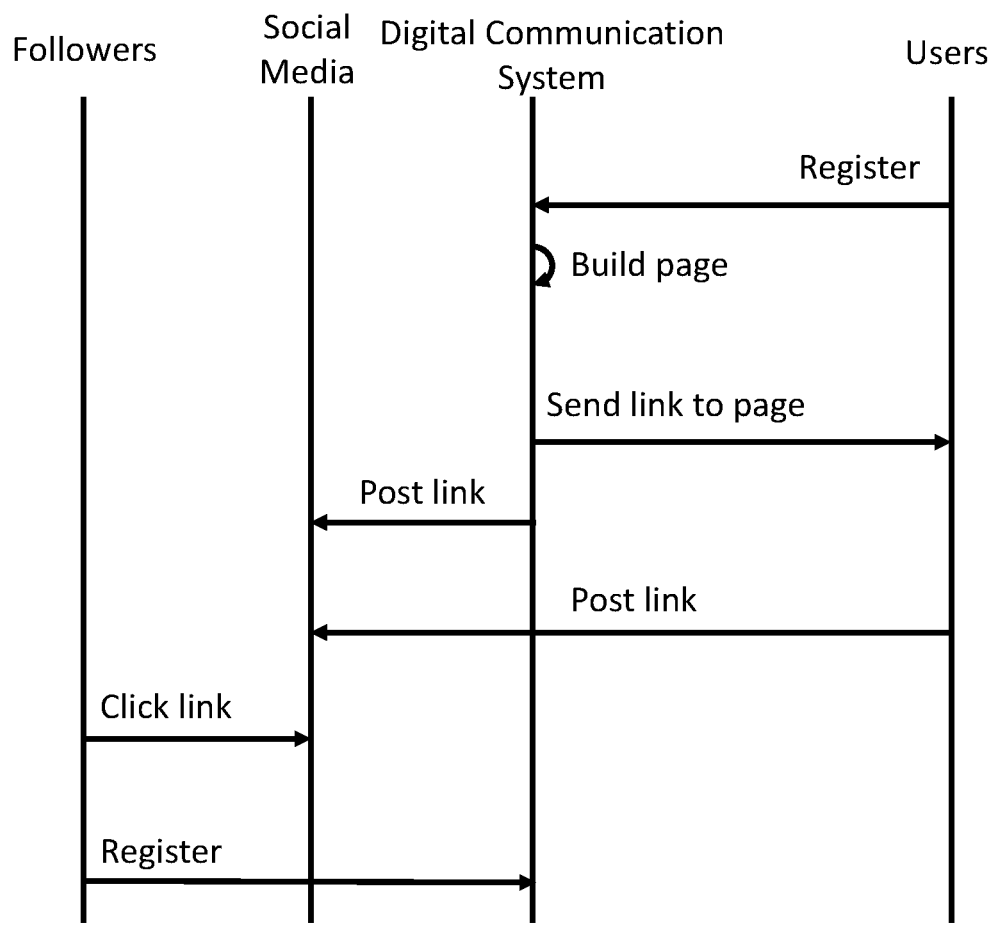
FIG. 3 illustrates a flow diagram for registering at a data communication queuing system in accordance with aspects of the present disclosure.

Now referring to FIG. 3, illustrated is a flow diagram for registering at a data communication queuing system according to aspects of the present disclosure. The data communication queuing system may attract users first prior to followers because followers follow the users. Users may be celebrities in music, sport, film & TV, creators, and more. Specifically, users may be singers, lyric creators, songwriters, dancers, or producers in R&B, electronic, rock, country, indie, metal, pop, or other genres in music industry; players or coaches in football, basketball, baseball, hockey, surfing, wrestling, boxing, tracks, cycling, racing, or any other sports; actors, actresses, directors, presenters, comedians, anchors, or announcers in reality TV, television dramas, movies, lifestyle, comedy, stage & screen, or other types in the film and TV industry; youtubers, tiktokers, authors, artists, bloggers, podcasters, or creators; and models, entertainers, mentors, politicians, physical trainers, mind trainers, influencers, chefs, magicians, pro-gamers, fitness trainers, or other famous peoples. The data communication queuing system may have qualifications to determine whether or not people is a celebrity or user. The qualifications may include a number of followers, which is greater than or equal to a threshold (e.g., "10,000," "100,000," or more) in at least one social media platform. The data communication queuing system may contact the users via emails, postings at social media, phone calls, or text messages including an introduction or registration hyperlink to the data communication queuing system.

When qualified, peoples may register at the data communication queuing system as users. The homepage management unit of the data communication queuing system may build a homepage for each user and generate and send to the user a link to the homepage of the user. The link to the homepage may be a hyperlink to the homepage or a deeplink to the homepage of a mobile or web application. Web browsers may be used to navigate to the hyperlink, and mobile or web application may be used to navigate the deeplink.

The users may post the link to the homepage on social media platforms, and likewise the data communication queuing system may post the links of users on social media platforms. Social media users may click the link to navigate the homepage of the user. When social media users like to follow the user, the social media users are led to the data communication queuing system so that they can register at the data communication queuing system as followers of the user. Registrations add followers to a list for the user, which is saved at the memory of the data communication queuing system. To register at the data communication queuing system, the social media users may have to provide their contact information to receive notifications from the data communication queuing system about the user's going live in a live digital communication.

Figure 4:
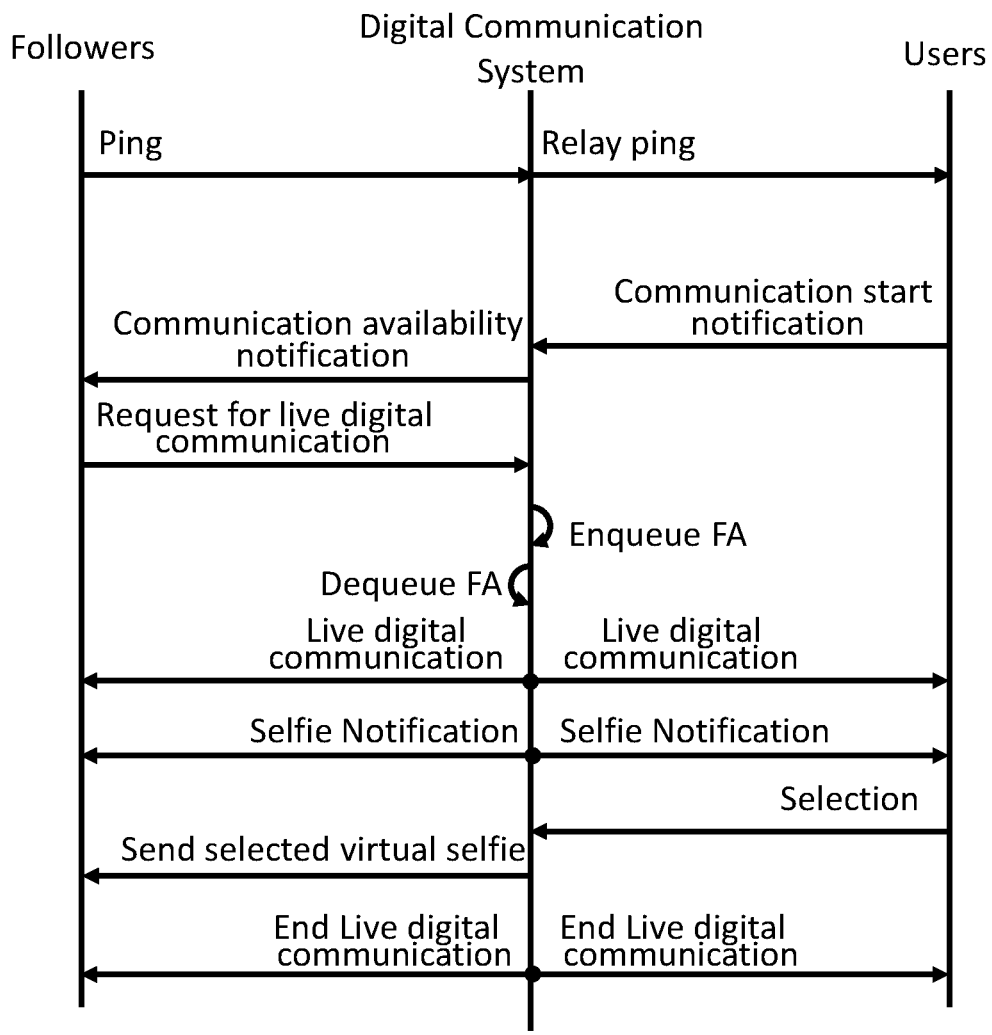
FIG. 4 illustrates flow diagram for starting a live digital communication via a communication queuing system in accordance with aspects of the present disclosure.

Referring now to FIG. 4, illustrated is a flow diagram for starting a live digital communication via a communication queuing system after registrations according to aspects of the present disclosure. Followers may be able to send one or more pings to one or more users to indicate that they are interested in having a live meet and greet or a live digital communication with the users and available for the live digital communication at the time of sending the pings. The data communication queuing system receives and relays the pings to appropriate users. The ping relay unit of the data communication queuing system may gather information about the time of the pings as available times of the followers of each user and provide an hourly, daily, weekly, and monthly trend of pings to users.

Users may review the trend of pings and determine the best time for the live digital communication. Thereafter, users may send a communication start notification to the data communication queuing system. The communication start notification may include a live digital communication start time, the predetermined period, a total period for live digital communications, and a price for each live digital communication. The live digital communication start time may include a date and a time for a live digital communication and may be determined by the user based on the trend of pings and the user's availability. Upon reception of the communication start notification, the data communication queuing system may send a communication availability notification to all followers in the list of followers of the user.

Alternatively, users may update their homepages at the data communication queuing system to indicate that they will go live and to identify when the live digital communication will start, how long each the live digital communication will last, how long the whole live digital communications will last, and how much each the live digital communication will cost. Such updating by users may be considered as the communication start notification. The data communication queuing system then accesses this information and send the communication availability notification to the followers who follow the user. The communication availability notification may include a link (e.g., a hyperlink or deeplink) to the homepage of the user and also include the information contained in the communication start notification.

In an aspect, the communication availability notification may be delivered to the followers in audio format so that the followers can listen to the information contained in the communication availability notification. Alternatively, the communication availability notification may be delivered in text or video format via emails, text messages, instant messaging, or any other formats.

In consideration of the information in the communication availability notification, a portion of the followers may send a request for the live digital communication to the data communication queuing system. The queue management unit of the data communication queuing system may enqueue the followers, who has sent the request, in the order of request reception times.

When followers meet requirements for the live digital communication, the followers are enqueued to the digital communication queue. The requirements may include payment of the price set by the user in the communication start notification. Or the requirements may be satisfied based on a previous situation where followers authorize a payment of the price previously but was not able to enter into a live digital communication previously because of unexpected circumstances.

The size of the digital communication queue is determined by the total period for live digital communications and the predetermined period for each live digital communication. If the total period is one hour and the predetermined period is 5 minutes, the size of the digital communication queue is then twelve. In a case the user has comparatively many followers in the trend of pings or there are a large number of followers in a virtual waiting room compared to the size of the digital communication queue, the user may set more than one in each position in the digital communication queue. For example, if the average number of followers in the trend or at the virtual waiting room is about one hundred and the size of the digital communication queue is 10, the user may set five or ten for each position in the digital communication queue so that the total followers in the digital communication queue can be fifty or one hundred. In this case the user may lower the price for each the live digital communication. On the other hand, the user is in high demand by the followers, the user may increase the price.

While followers are in the digital communication queue waiting for a live digital communication, each follower may have one or more opportunities for virtual entertainment made for the followers. Further, the followers may be informed about the current status of the live digital communication. The current status may include an estimated time for his turn for a live digital communication, and/or a current position in the digital communication queue in real time. Further, for followers who are not in the digital communication queue, these pieces of information may be also updated in the homepage of the user so that they can be also informed of such.

In aspects, the number of the digital communication queue may be one, two, or more than two. In a case where there is only one digital communication queue, the order of joining the live digital communication is FIFO, following the enqueuing order to the digital communication queue. A portion of the followers may receive the communication availability notification first in advance before the other followers can receive it. The portion of the followers in this case may be more favored by the user. For example, the portion of the followers may be the ones who have pinged the user one or two hours before the live digital communication starts or the ones who were in the digital communication queue previously but were not able to join the live digital communication due to the user's abrupt or unplanned termination of the live digital communication, termination of the digital communication queue because of technical problems, or any other reasons.

For example, the user may terminate based on inappropriate behavior of a follower or vice versa during the live digital communication. In a case when the user calls off the live digital communication, the digital communication queue is terminated right at the moment of calling off. On the other hand, when a follower calls off the live digital communication, the current the live digital communication is terminated but the digital communication queue is not terminated and the follower, who is in the first position in the live digital communication, may be dequeued for the next the live digital communication.

In a case where there are two digital communication queues, one digital communication queue is a normal queue and the other digital communication queue is a priority queue. For example, followers who have received a private invitation from the user, who receive the communication availability notification first before the other followers can receive it, who have pinged the user, or who were in the digital communication queue previously but were not able to join the live digital communication due to the user's abrupt or unplanned termination of the live digital communication or the termination may be invited to the priority digital communication queue so that they can have a live digital communication prior to the other followers in the normal digital communication queue.

In aspects, the digital communication queue may be a closed queue, meaning that the closed queue is closed to the public and no followers are able to join the live digital communication without a private invitation. In other words, followers, who have not received the private invitation and have found out that there is a live digital communication, are not able to join the closed live digital communication, and followers who have received the private invitation are only able to join the live digital communication. Private invitation may be provided to reward certain followers who have won a competition or have a special occasion (e.g., the $20^{th}$ anniversary, marriage proposal, pass of an important exam, silent auctions for promotions or charity events, etc.). In this case, the private invitation may include a unique link to the closed digital communication queue. The user may be notified of the follower's information based on sticky transparent notes before entering into a live digital communication with the follower. Status information about the closed digital communication queue may not be updated in the user's homepage but may be updated to the followers in the closed digital communication queue.

When a next live digital communication is ready to start and a follower is in the first in the digital communication queue, the follower is dequeued. In an aspect, the follower may have to meet the requirements identified by the communication start notification or communication availability notification. For example, the follower has to pay the price for the live digital communication. After the follower has met the requirements, a live digital communication is started between the follower and the user. During the live digital communication, the follower and the user are experiencing live one-on-one communication.

At a predetermined time prior to the end time of the live digital communication, the data communication queuing system may provide a selfie notification to the user and the follower. The predetermined time for the selfie notification may be up to 30 seconds, one minute, two minutes, three minutes, or greater than three minutes. The predetermined time may be predetermined based on a period required to have a short conversation and to take one or more selfies. The predetermined time for the selfies may be a part of the predetermined period for each live digital communication or added after the predetermined period for each live digital communication. The data communication queuing system may present various backgrounds and the selfies to the user, receive a selection of one selfie and a choice of one background, and generate a virtual selfie by superimposing one selfie of the user and another selfie for the follower over the background. After receiving a confirmation from the user, the data communication queuing system sends the selected virtual selfie to the follower and, at the end time, ends the live digital communication.

When the user unexpectedly has to leave the live digital communication due to emergency or any other reasons, the digital communication queue is immediately terminated. In this regard, the user may have a full control over the whole live digital communications. In other words, the user can start a live digital communication and end the live digital communication at any time for any reasons before the total period for live digital communications has passed. When the live digital communication is ended by the user, the digital communication queue is correspondingly terminated and the followers who has been in the digital communication queue and waiting for the next the live digital communication are also forced to leave the digital communication queue. Afterward, these followers may receive a private invitation from the user for a next live digital communication, or receive a communication availability notification well before the other followers receive it.

Figure 5:
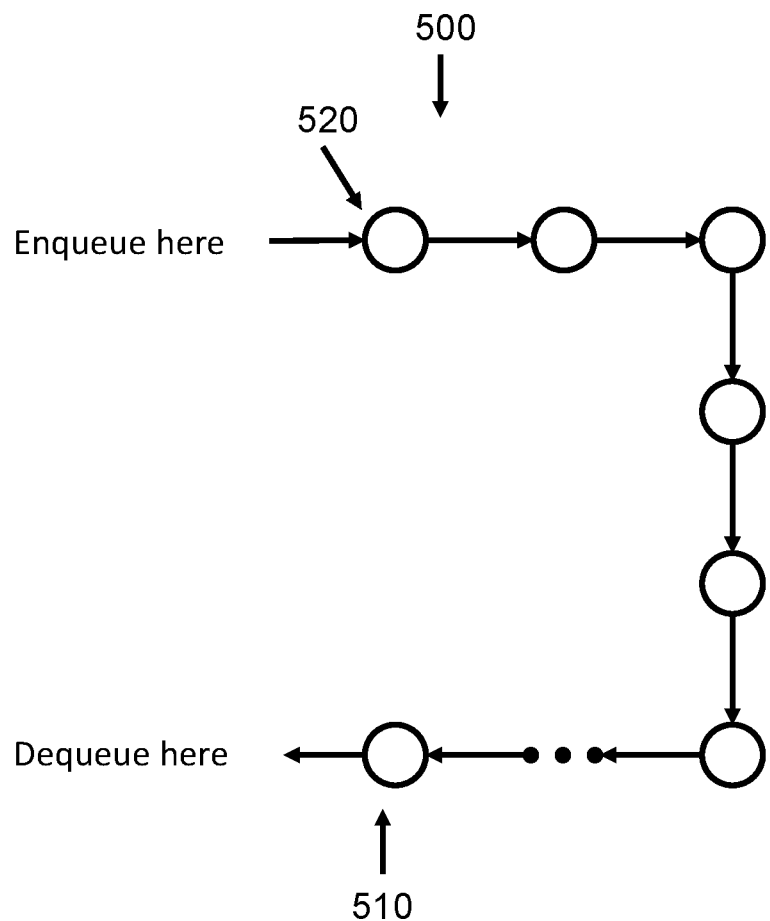
FIG. 5 illustrates a diagram for a data communication queue in accordance with aspects of the present disclosure.

Referring now to FIG. 5, illustrated is a queue 500 according to aspects of the present disclosure. The queue 500 is a linear data structure used to implement first-in-first-out (FIFO) principle. The queue 500 includes a head node 510 and a rear node 520. When the head node 510 and the rear node 520 are the same or point to null, the queue 500 includes no element or is empty. When new element comes, a new element is added to the queue 500 or enqueued from the rear node 520, the head node 510 points to the newly added element, and the rear node 520 also points to the new element. When another new element is added or enqueued from the rear node 520, another new element points to the previously added element, and the rear node 520 points to the newly added element. In this way, enqueuing operation increases the size of the queue 500 by one with the head node 510 pointing to the firstly added element. Similarly, when a follower wants to join a live digital communication, the follower is enqueued to the digital communication queue.

The queue 500 may have a size variable, which shows the number of elements currently in the queue 500. Likewise, the digital communication queue may have a size variable to show the number of followers currently in the digital communication queue. The size of the digital communication queue may be predetermined based on the predetermined period for each the live digital communication and a total period for live digital communications. Thus, after the number of followers enqueued to the digital communication queue reaches the predetermined size, the digital communication queue may be prevented from enqueuing more followers, unless followers in the digital communication queue voluntarily leaves the digital communication queue.

In aspects, when users look at the queue, the first five in the head node 510 of the queue 500 may be shown in pictures and the rest may be shown as a number. In this way, the users are able to see who are in the queue 500 and anticipate whom they will have a live digital communication with. The number of pictures shown in the queue 500 may be less than or greater than five.

When the firstly added element is removed or dequeued from the queue 500, the head node 510 points to the secondly added element, which becomes the firstly added element among elements remaining in the queue 500, and the size of the queue 500 is decreased by one. Likewise, when the next live digital communication is ready to start, the firstly added follower is dequeued from the digital communication queue and the size of the digital communication queue is decreased by one. Status about the digital communication queue may be notified to followers currently remaining in the digital communication queue.

The data communication queuing system may manage two digital communication queues, one for normal queue and the other one for a prioritized queue. However, the way how to enqueue and dequeue followers is the same. The data communication queuing system may dequeue followers from the prioritized queue first and then dequeue followers in the normal queue. As described above, followers in the prioritized queue may be the ones who were in the previous digital communication queue but were not able to join the live digital communication, who pinged the user one or two hours before the live digital communication start time, or who have a special occasion (e.g., the $20^{th}$ anniversary, marriage proposal, pass of an important exam, silent auctions for promotions or charity events, etc.).

In an aspect, the data communication queuing system may run a virtual waiting room where followers who have not been enqueued to the digital communication queue are waiting for an opportunity to be enqueued. Based on the number of followers in the virtual waiting room, the corresponding user may consider adjusting the price for each live digital communication and the predetermined time for each live digital communication.

Figure 6A:
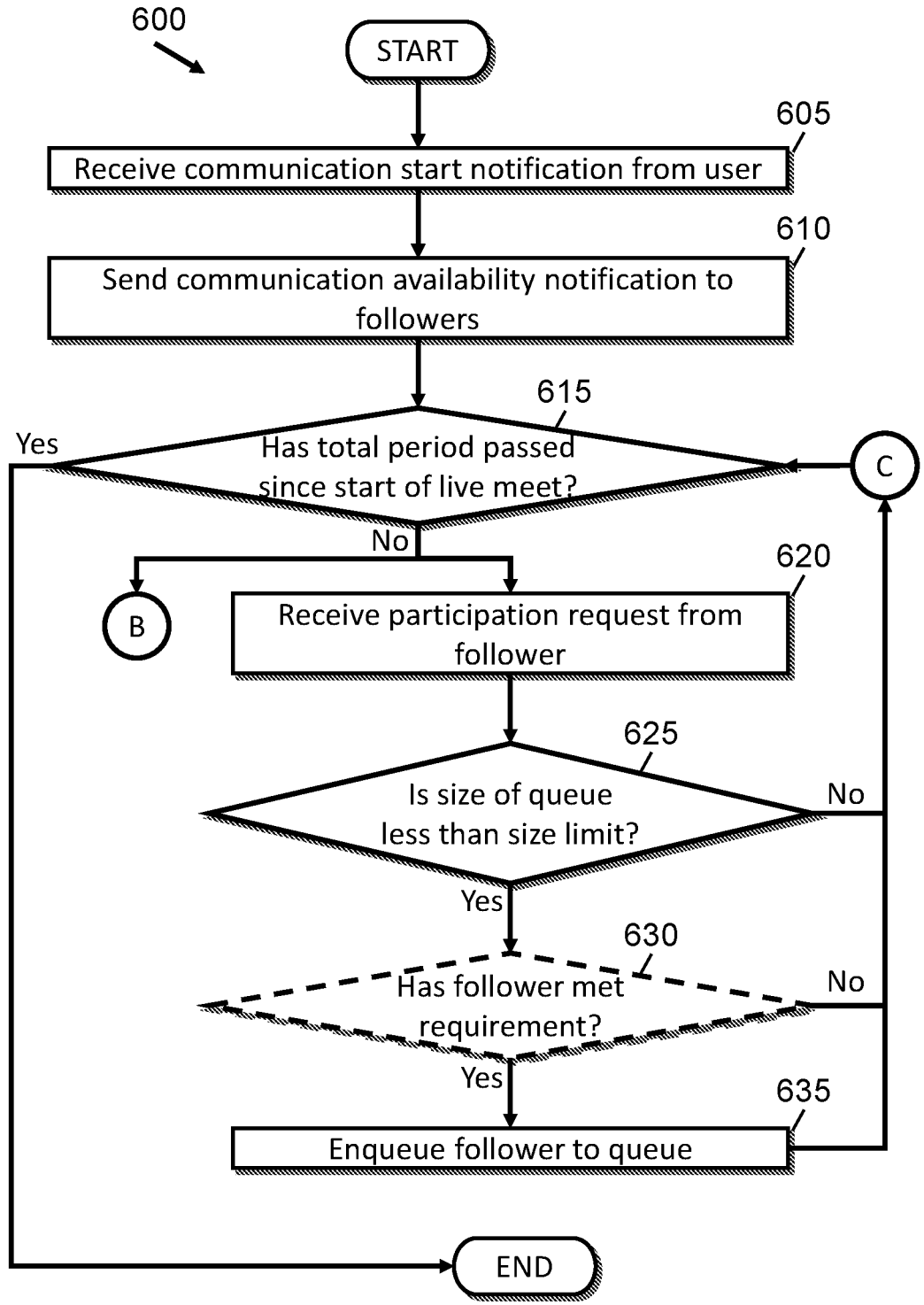
FIGS. 6A and 6B illustrate a flowchart of a method for connecting users and followers for live digital communication via a data communication queue in accordance with aspects of the present disclosure.
Figure 6B:
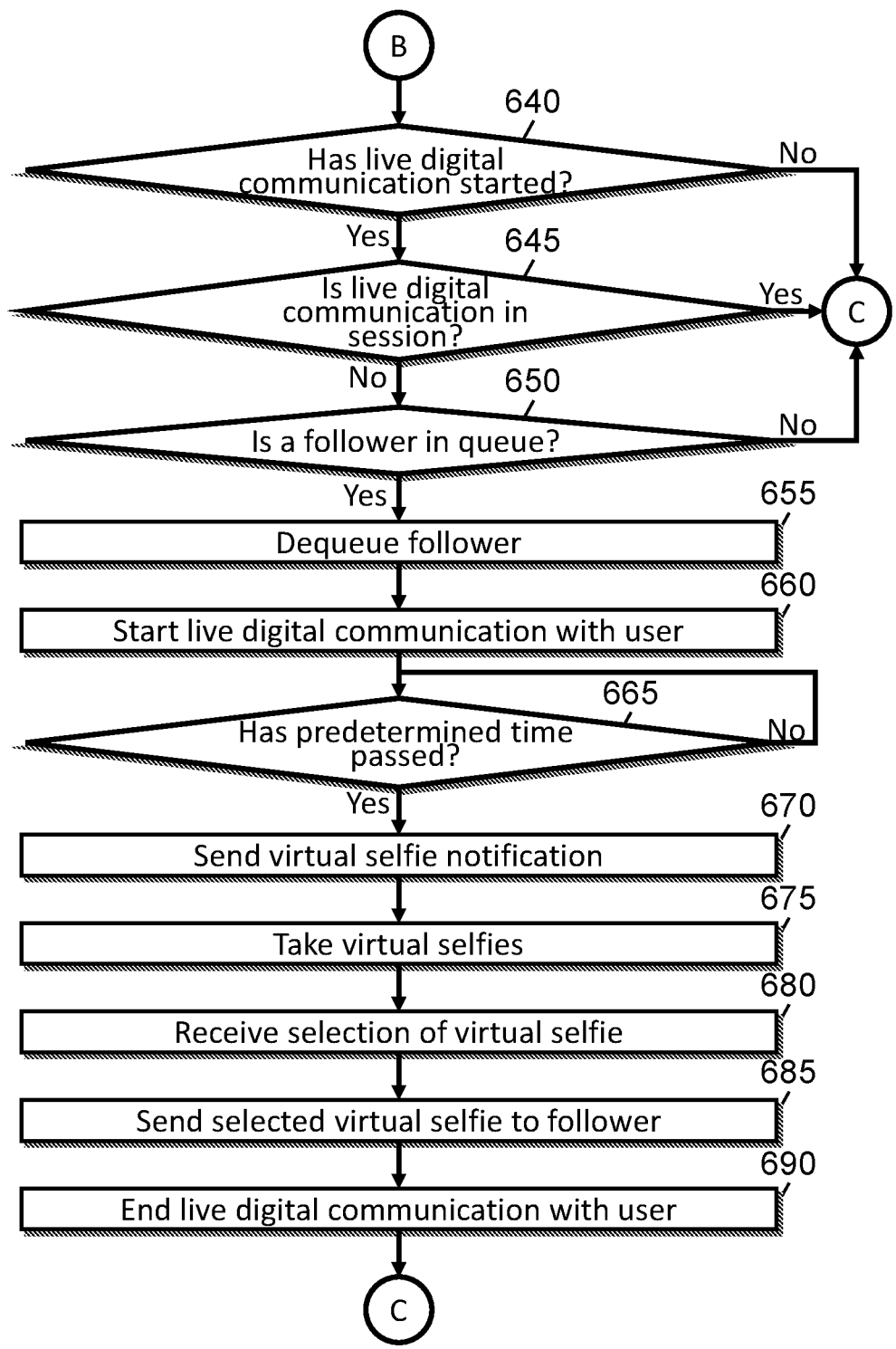

FIGS. 6A and 6B illustrate a data communication queuing method 600 for connecting users and followers for a one-on-one live digital communication via a digital communication queue according to aspects of the present disclosure. Based on the availability schedule of a user, the user may start a live digital communication, which has not been scheduled with the user's followers. The date and time of the live digital communication may be unplanned, unexpected to the followers of the user. The method 600 enables an impromptu live digital communication by sending a notification to the user's followers. The method 600 starts by receiving a communication start notification from a user at step 605. The communication start notification may include details about the live digital communication. For example, the communication start notification may include a live digital communication start time, the predetermined period indicating a duration of each live digital communication, a total period for live digital communications, and a price for each live digital communication. Based on the communication start notification, the live digital communication may be started at the live digital communication start time, each data communication queuing system may last for the predetermined period, and the whole live digital communications may last for the total period.

Prior to step 605, a portion of the followers of the user may ping the user. Based on the time, day, and week trend of the pings, the user may be able to find the best time, day, and week for the live digital communication with a high probability that more followers can join the live digital communication.

At step 610, a communication availability notification is prepared with necessary information and sent to contact information of the followers of the user. The contact information was provided by the followers at the time of registration and has been saved in a database in a memory. The necessary information may not include all the information in the communication start notification. For example, the necessary information may include the live digital communication start time, the total period, and the price to join a live digital communication. On the other hand, the necessary information may include information not in the communication start notification. For example, the hyperlink or deeplink to the live digital communication of the user is generated by the data communication queuing system and added to the communication availability notification.

At step 615, it is determined whether or not the total period has passed since the live digital communication start time. In a case where it is determined that the total period has passed since the live digital communication start time, the method 600 is ended because there is no more live digital communication.

While the total period has not passed, a portion of the followers of the user may go to an online or virtual waiting room to rush into the digital communication queue. Anyone who arrives at the waiting room first may be able to be enqueued to the digital communication queue in order. Anyone who is in the virtual waiting room but has not been able to be enqueued to the digital communication queue may still enjoy virtual entertainment about the user by watching videos, looking at pictures of the user, or listening to songs of the user.

During the total period, two processes are performed parallelly. One process is related to enqueuing operations in steps 620-635 illustrated in FIG. 6A, and the other process is related to dequeuing operations, the live digital communication, and virtual selfie operations at steps 640-690 illustrated in FIG. 6B. Both processes are described below.

Any follower who arrives at the virtual waiting room first may send a queue-join request for a live digital communication with the user, and the method 600 receives the queue-join request at step 620. The queue-join request may be done by the follower clicking or pressing a button displayed in the virtual waiting room within the user's homepage. The button may remain displayed until a number of followers in the digital communication queue reaches the queue size limit. When the number of followers in the digital communication queue reaches the queue size limit, the button may be deactivated to notify followers in the virtual waiting room that no more followers can be added to the digital communication queue. Even though some followers are not able to enter into the digital communication queue, they still enjoy other entertainment items (e.g., videos, songs, pictures, games, stories, news articles, or other multimedia contents related to the user) in the virtual waiting room. The button may be re-activated in a case when a follower in the digital communication queue has voluntarily left prior to joining the live digital communication. In that case, any follower who clicks or presses the button first may be able to enter into the digital communication queue.

After receiving the queue-join request, it is determined whether or not the current size of the digital communication queue is less than the size limit of the digital communication queue at step 625. The current size of the digital communication queue may include the followers who were dequeued from the digital communication queue in addition to the number of followers in the digital communication queue. By considering the followers who were dequeued from the digital communication queue, followers in the virtual waiting room are prevented from erroneously entering into the digital communication queue. On the other hand, the current size of the digital communication queue may not consider or include a number of followers who voluntarily left the digital communication queue before being dequeued. Thus, when a follower voluntarily leaves the digital communication queue, the current size of the digital communication queue is decreased by one, the button may be re-activated, and any follower who has been in the virtual waiting room and clicks or presses the button may be able to enter into the digital communication queue.

When it is determined that the current size of the digital communication queue is not less than the size limit of the digital communication queue, the method 600 returns to step 615 and parallelly repeats both processes until the total period passes since start of the live digital communication.

When it is determined that the current size of the digital communication queue is less than the size limit of the digital communication queue, step 630 may be optionally performed by checking whether or not the follower has met the requirement, which may be a prerequisite (e.g., payment of the price) included in the communication availability notice. Since step 630 is identified as optional, step 635 may be performed directly after step 625.

At step 635, the follower is enqueued to the digital communication queue. Due to the fact that a follower already enqueued to the digital communication queue may voluntarily leave the digital communication queue, payment of the price does not have to be authorized prior to step 635. Instead, step 635 may be performed right before the dequeuing step, step 655 of FIG. 6B, which will be described below.

After the enqueuing operation at step 635, the method 600 returns to step 615 and parallelly repeats both processes until the total period passes since start of the live digital communication.

In a case that step 630 is performed before step 630, the payment of the price may be the prerequisite for the enqueuing operation. Thus, if the follower does not pay the price, the follower loses the opportunity to enter the live digital communication, and the method 600 returns to step 615 and parallelly repeats both processes until the total period passes since start of the live digital communication.

In another case when the follower has authorized payment of the price and has been enqueued to the digital communication queue, and when the follower voluntarily leaves the digital communication queue or is forced to leave the digital communication queue due to unexpected situations, the follower may receive a chance to enter into a prioritized digital communication queue next time. The unexpected situations may be that the user terminates the digital communication queue with or without reasons, that the live digital communication was terminated due to technical issues, or that the digital communication queue was terminated.

Now turning to the other parallel operations illustrated in FIG. 6B, at step 640, it is determined whether or not the live digital communication has started. Or at step 640, it is determined whether or not the live digital communication start time has passed. If not, the method 600 returns to step 615 and parallelly repeats both processes until the total period passes.

In a case where it is determined that the live digital communication has started or the live digital communication start time has passed, it is also determined whether or not the live digital communication is in session at step 645. While the live digital communication is in session, the method 600 returns to step 615 and parallelly repeats both processes until the total period passes.

In a case where the digital communication queue is not in session, it is also determined whether or not there is a follower in the digital communication queue at step 650. When it is determined that there is no follower in the digital communication queue, the method 600 also returns to step 615 and parallelly repeats both processes so that any followers in the virtual waiting room can enter into the digital communication queue until the total period passes.

In a case where it is determined that there is a follower in the digital communication queue, the follower pointed by the head node of the digital communication queue is then dequeued at step 655. In an aspect, when step 630 was not performed before step 635, step 630 needs to be performed prior to this dequeuing step. In other words, the follower has to pay the price prior to the dequeuing step at step 655.

Now at step 660, the follower may start a live digital communication with the user. The live digital communication can last for the predetermined time. Thus, at step 665, it is determined whether or not the predetermined time has passed. The predetermined time may be one to three minutes less than the actual duration of the live digital communication. The difference between the predetermined time and the actual duration is for the selfie operation.

In a case where it is determined that the predetermined time has passed, a virtual selfie notification is sent to both the user and the follower at step 670. The data communication queuing system may provide a countdown to take each selfie. During the countdown, the user and the follower may make various poses to make the selfies memorable.

After the countdown, one or more selfies are taken at step 675. The method 600 may allow one to three selfies. However, the number of selfies may be greater than three to satisfy the user and the follower.

At step 680, the user may select one of the selfies. In an aspect, the user may be able to select one background from among a plurality of backgrounds. The selected selfie may be superimposed over the selected background to make a virtual selfie.

At step 685, the virtual selfie is sent to the follower. The virtual selfie may memorialize the live digital communication with the user for the follower and be also saved in the data communication queuing system. After sharing the virtual selfie, the follower and the user may exchange farewell or goodbye with each other, and at step 690, the live digital communication is ended. Then, the method 600 also returns to step 615 and parallelly repeats both processes so that any followers in the virtual waiting room can enter into the digital communication queue until the total period passes.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a plurality of web based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed aspects may comprise or utilize a special purpose or general-purpose computer including computer hardware, as discussed in greater detail below. Disclosed aspects also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, aspects of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present disclosure may also be enumerated as exemplary aspects, which may be combined or substituted with the above-listed configurations in any variation or format. For example, in a first aspect, a data communication queuing method connects users and followers for one-on-one live digital communication via a digital communication queue. The data communication queuing method includes receiving a communication start notification from a first computing device associated with a first user account, accessing a list of a plurality of other user accounts that are linked to the first user account, sending a communication availability notification to at least a portion of the plurality of other user accounts, operating a digital communication queue, enabling a live digital communication between the first user account and the at least one user account of the multiple other user accounts for a predetermined period, and ending the live digital communication between the first user account and the at least one user account of the multiple other user accounts after the predetermined period. The digital communication queue is operated by receiving a queue-join request from multiple other user accounts selected from the plurality of other user accounts, in response to the queue-join request, enqueuing the multiple other user accounts in a determined order, and dequeuing at least one user account of the multiple other user accounts in the determined order.

In a second aspect, the data communication queuing method as recited in the first aspect further includes, after the live digital communication between the first user account and the at least one user account of the multiple other user accounts, dequeuing at least another user account of the multiple other user accounts in the determined order and enabling a live digital communication between the first user account and the at least another user account of the multiple other user accounts for the predetermined period.

In a third aspect, in the data communication queuing method as recited in any of the preceding aspects, the communication availability notification includes a live digital communication start time, the predetermined period, a total period for live digital communications, and a price for each live digital communication. In a fourth aspect, the data communication queuing method as recited in any of the preceding aspects further includes preventing an enqueuing operation after a number of user accounts of the multiple other user accounts have been enqueued. In a fifth aspect, in the data communication queuing method as recited in any of the preceding aspects, the number of user accounts of the multiple other user accounts is calculated based on the predetermined period and the total period for live digital communications.

In a sixth aspect, the data communication queuing method as recited in any of the preceding aspects further includes at a predetermined selfie time before the predetermined period, sending a selfie notification to the first user account and the at least one user account of the multiple other user accounts. In a seventh aspect, in the data communication queuing method as recited in any of the preceding aspects, the selfie notification notifies the first user account and the at least one user account of the multiple other user accounts about taking a predetermined number of virtual selfies. In a eighth aspect, the data communication queuing method as recited in any of the preceding aspects further includes receiving a selection of one among the predetermined number of virtual selfies from the first user account and sending the selected virtual selfie to the at least one user account of the multiple other user accounts.

In a ninth aspect, in the data communication queuing method as recited in any of the preceding aspects, an enqueuing operation is performed after receiving an authorization of a payment of the price for each live digital communication.

In a tenth aspect, the data communication queuing method as recited in any of the preceding aspects further includes relaying a ping from one or more of the plurality of other user accounts to the first user account. In an eleventh aspect, in the data communication queuing method as recited in any of the preceding aspects, the live digital communication start time is determined by the first user account based on a trend of pings from the one or more of the plurality of other user accounts. In a twelfth aspect, in the data communication queuing method as recited in any of the preceding aspects, the one or more of the plurality of other user accounts receive the communication availability notification in advance by a predetermined time before the communication availability notification is sent to at least the portion of the plurality of other user accounts.

In a thirteenth aspect, in the data communication queuing method as recited in any of the preceding aspects, the communication availability notification is sent through one or more social media, in-app text message, or a deep link.

In a fourteenth aspect, in an additional or alternative configuration of the present disclosure, a data communication queuing system connects users and followers for one-on-one live digital communication via a digital communication queue. The data communication queuing system includes one or more processors and one or more storage media including instructions stored thereon. The instructions, when executed by the one or more processors, cause the data communication queuing system to receive a communication start notification from a first computing device associated with a first user account, access a list of a plurality of other user accounts that are linked to the first user account, send a communication availability notification to at least a portion of the plurality of other user accounts, operate a digital communication queue, enable a live digital communication between the first user account and the at least one user account of the multiple other user accounts for a predetermined period, and end the live digital communication between the first user account and the at least one user account of the multiple other user accounts after the predetermined period. The digital communication queue is operated by receiving a queue-join request from multiple other user accounts selected from the plurality of other user accounts, In response to the queue-join request, enqueuing the multiple other user accounts in a determined order and dequeuing at least one user account of the multiple other user accounts in the determined order.

In a fifteenth aspect, in the data communication queuing system in the fourteenth aspect, the instructions, when executed by the one or more processors, further cause the data communication queuing system to, after the live digital communication between the first user account and the at least one user account of the multiple other user accounts, dequeue at least another user account of the multiple other user accounts in the determined order and enable a live digital communication between the first user account and the at least another user account of the multiple other user accounts for the predetermined period.

In a sixteenth aspect, in the data communication queuing system in any of the proceeding fourteenth through fifteenth aspects, the communication availability notification includes a live digital communication start time, the predetermined period, a total period for live digital communications, and a price for each live digital communication. In a seventeenth aspect, in the data communication queuing system in any of the proceeding fourteenth through sixteenth aspects, the instructions, when executed by the one or more processors, further cause the data communication queuing system to prevent an enqueuing operation after a number of user accounts of the multiple other user accounts have been enqueued. In an eighteenth aspect, in the data communication queuing system in any of the proceeding fourteenth through seventeenth aspects, the number of user accounts of the multiple other user accounts is calculated based on the predetermined period and the total period for live digital communications.

In a nineteenth aspect, in the data communication queuing system in any of the proceeding fourteenth through eighteenth aspects, the instructions, when executed by the one or more processors, further cause the data communication queuing system to at a predetermined selfie time before the predetermined period, send a selfie notification to the first user account and the at least one user account of the multiple other user accounts. In a twentieth aspect, in the data communication queuing system in any of the proceeding fourteenth through nineteenth aspects, the selfie notification notifies the first user account and the at least one user account of the multiple other user accounts about taking a predetermined number of virtual selfies. In a twenty first aspect, in the data communication queuing system in any of the proceeding fourteenth through twentieth aspects, the instructions, when executed by the one or more processors, further cause the data communication queuing system to receive a selection of one among the predetermined number of virtual selfies from the first user account and send the selected virtual selfie to the at least one user account of the multiple other user accounts.

In a twenty second aspect, in the data communication queuing system in any of the proceeding fourteenth through twenty first aspects, an enqueuing operation is performed after receiving an authorization of a payment of the price for each live digital communication.

In a twenty third aspect, in the data communication queuing system in any of the proceeding fourteenth through twenty second aspects, the instructions, when executed by the one or more processors, further cause the data communication queuing system to relay a ping from one or more of the plurality of other user accounts to the first user account. In a twenty fourth aspect, in the data communication queuing system in any of the proceeding fourteenth through twenty third aspects, the live digital communication start time is determined by the first user account based on a trend of pings from the one or more of the plurality of other user accounts. In a twenty fifth aspect, in the data communication queuing system in any of the proceeding fourteenth through twenty fourth aspects, the one or more of the plurality of other user accounts receive the communication availability notification in advance by a predetermined time before the communication availability notification is sent to at least the portion of the plurality of other user accounts.

In a twenty sixth aspect, in an additional or alternative configuration of the present disclosure, a non-transitory computer-readable medium includes instructions stored thereon that, when executed by a computer, cause the computer to perform a method for connecting users and followers for one-on-one live digital communication via a digital communication queue. The method includes receiving a communication start notification from a first computing device associated with a first user account, accessing a list of a plurality of other user accounts that are linked to the first user account, sending a communication availability notification to at least a portion of the plurality of other user accounts, operating a digital communication queue, enabling a live digital communication between the first user account and the at least one user account of the multiple other user accounts for a predetermined period, and ending the live digital communication between the first user account and the at least one user account of the multiple other user accounts after the predetermined period. The digital communication queue is operated by receiving a queue-join request from multiple other user accounts selected from the plurality of other user accounts, in response to the queue-join request, enqueuing the multiple other user accounts in a determined order, and dequeuing at least one user account of the multiple other user accounts in the determined order.

The present invention may be embodied in other specific forms without departing from its spirit or characteristics. The described aspects are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data communication queuing method comprising:
receiving a communication start notification from a first computing device associated with a first user account;
accessing a list of a plurality of other user accounts that are linked to the first user account;
sending a communication availability notification to at least a portion of the plurality of other user accounts;
operating a digital communication queue by:
receiving a queue-join request from multiple other user accounts selected from the plurality of other user accounts;
in response to the queue-join request, enqueuing the multiple other user accounts in a determined order; and dequeuing at least one user account of the multiple other user accounts in the determined order;
enabling a live digital communication between the first user account and the at least one user account of the multiple other user accounts for a predetermined period; and
ending the live digital communication between the first user account and the at least one user account of the multiple other user accounts after the predetermined period,
wherein the communication availability notification includes a live digital communication start time, the predetermined period, a total period for live digital communications, and a price for each live digital communication.

2. The data communication queuing method according to claim 1, further comprising, after the live digital communication between the first user account and the at least one user account of the multiple other user accounts:
dequeuing at least another user account of the multiple other user accounts in the determined order; and
enabling a live digital communication between the first user account and the at least another user account of the multiple other user accounts for the predetermined period.

3. The data communication queuing method according to claim 1, further comprising:
preventing an enqueuing operation after a number of user accounts of the multiple other user accounts have been enqueued.

4. The data communication queuing method according to claim 3, wherein the number of user accounts of the multiple other user accounts is calculated based on the predetermined period and the total period for live digital communications.

5. The data communication queuing method according to claim 1, further comprising:
at a predetermined selfie time before the predetermined period, sending a selfie notification to the first user account and the at least one user account of the multiple other user accounts.

6. The data communication queuing method according to claim 5, wherein the selfie notification notifies the first user account and the at least one user account of the multiple other user accounts about taking a predetermined number of virtual selfies.

7. The data communication queuing method according to claim 6, further comprising:
receiving a selection of one among the predetermined number of virtual selfies from the first user account; and
sending the selected virtual selfie to the at least one user account of the multiple other user accounts.

8. The data communication queuing method according to claim 1, wherein an enqueuing operation is performed after receiving an authorization of a payment of the price for each live digital communication.

9. The data communication queuing method according to claim 1, further comprising:
relaying a ping from one or more of the plurality of other user accounts to the first user account.

10. The data communication queuing method according to claim 9, wherein the live digital communication start time is determined by the first user account based on a trend of pings from the one or more of the plurality of other user accounts.

11. The data communication queuing method according to claim 9, wherein the one or more of the plurality of other user accounts receive the communication availability notification in advance by a predetermined time before the communication availability notification is sent to at least the portion of the plurality of other user accounts.

12. The data communication queuing method according to claim 1, wherein the communication availability notification is sent through one or more social media, in-app text message, or a deep link.

13. A data communication queuing system comprising:
one or more processors; and
one or more storage media including instructions stored thereon that, when executed by the one or more processors, cause the data communication queuing system to:
receive a communication start notification from a first computing device associated with a first user account;
access a list of a plurality of other user accounts that are linked to the first user account;
send a communication availability notification to at least a portion of the plurality of other user accounts;
operate a digital communication queue by:
receiving a queue-join request from multiple other user accounts selected from the plurality of other user accounts;
In response to the queue-join request, enqueuing the multiple other user accounts in a determined order; and
dequeuing at least one user account of the multiple other user accounts in the determined order;
enable a live digital communication between the first user account and the at least one user account of the multiple other user accounts for a predetermined period; and
end the live digital communication between the first user account and the at least one user account of the multiple other user accounts after the predetermined period,
wherein the communication availability notification includes a live digital communication start time, the predetermined period, a total period for live digital communications, and a price for each live digital communication.

14. The data communication queuing system according to claim 13, wherein the instructions, when executed by the one or more processors, further cause the data communication queuing system to, after the live digital communication between the first user account and the at least one user account of the multiple other user accounts:
dequeue at least another user account of the multiple other user accounts in the determined order; and
enable a live digital communication between the first user account and the at least another user account of the multiple other user accounts for the predetermined period.

15. The data communication queuing system according to claim 13, wherein the instructions, when executed by the one or more processors, further cause the data communication queuing system to:
prevent an enqueuing operation after a number of user accounts of the multiple other user accounts have been enqueued.

16. The data communication queuing system according to claim 15, wherein the number of user accounts of the multiple other user accounts is calculated based on the predetermined period and the total period for live digital communications.

17. The data communication queuing system according to claim 13, wherein the instructions, when executed by the one or more processors, further cause the data communication queuing system to:
- at a predetermined selfie time before the predetermined period, send a selfie notification to the first user account and the at least one user account of the multiple other user accounts.

18. The data communication queuing system according to claim 17, wherein the selfie notification notifies the first user account and the at least one user account of the multiple other user accounts about taking a predetermined number of virtual selfies.

19. The data communication queuing system according to claim 18, wherein the instructions, when executed by the one or more processors, further cause the data communication queuing system to:
- Receive a selection of one among the predetermined number of virtual selfies from the first user account; and
- send the selected virtual selfie to the at least one user account of the multiple other user accounts.

20. The data communication queuing system according to claim 13, wherein an enqueuing operation is performed after receiving an authorization of a payment of the price for each live digital communication.

21. The data communication queuing system according to claim 13, wherein the instructions, when executed by the one or more processors, further cause the data communication queuing system to:
- relay a ping from one or more of the plurality of other user accounts to the first user account.

22. The data communication queuing system according to claim 21, wherein the live digital communication start time is determined by the first user account based on a trend of pings from the one or more of the plurality of other user accounts.

23. The data communication queuing system according to claim 21, wherein the one or more of the plurality of other user accounts receive the communication availability notification in advance by a predetermined time before the communication availability notification is sent to at least the portion of the plurality of other user accounts.

24. A non-transitory computer storage medium including instructions stored thereon that, when executed by a computer, cause the computer to perform a method comprising:
- receiving a communication start notification from a first computing device associated with a first user account;
- accessing a list of a plurality of other user accounts that are linked to the first user account;
- sending a communication availability notification to at least a portion of the plurality of other user accounts;
- operating a digital communication queue by:
  - receiving a queue-join request from multiple other user accounts selected from the plurality of other user accounts;
  - in response to the queue-join request, enqueuing the multiple other user accounts in a determined order; and
  - dequeuing at least one user account of the multiple other user accounts in the determined order;
- enabling a live digital communication between the first user account and the at least one user account of the multiple other user accounts for a predetermined period; and
- ending the live digital communication between the first user account and the at least one user account of the multiple other user accounts after the predetermined period,
- wherein the communication availability notification includes a live digital communication start time, the predetermined period, a total period for live digital communications, and a price for each live digital communication.

* * * * *